May 23, 1933.  R. E. BEVILL  1,910,083

IDLER GEAR

Filed April 4, 1932

Roy E. Bevill,
INVENTOR

BY Victor J. Evans & Co.
ATTORNEY

WITNESS

Patented May 23, 1933

1,910,083

UNITED STATES PATENT OFFICE

ROY E. BEVILL, OF SHREVEPORT, LOUISIANA

IDLER GEAR

Application filed April 4, 1932. Serial No. 603,155.

From practical experience I have found that the operation of oil pumps used in the motors of small internal combustion engines, especially those employed with the type of engines used on the well known make of small automobiles, (known as the Ford Model A) result in a great and unnecessary waste of oil. These parts not only cause the oil to circulate too rapidly but whip or churn the lubricant, causing the same to lose its density and to be delivered in a thin state on the parts to be lubricated. In my experiments I have found that by causing the pump to operate in a manner that will deliver the oil in practically its original state to the parts to be lubricated that a large saving of oil may be obtained, that only one-half of the quantity required when operated upon by the present type of pump with respect to the same distance the vehicle travels when the oil is forced to the parts to be lubricated by my improved pump construction.

To the attainment of the foregoing the invention consists in the improvement hereinafter described and definitely claimed.

Figure 1:
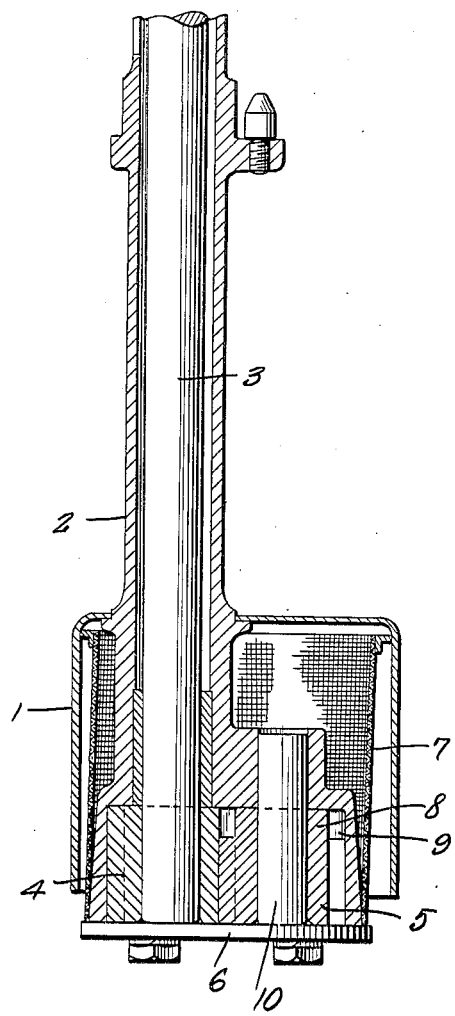
Figure 1 is a sectional view through an oil pump in accordance with this invention.
Figure 2:
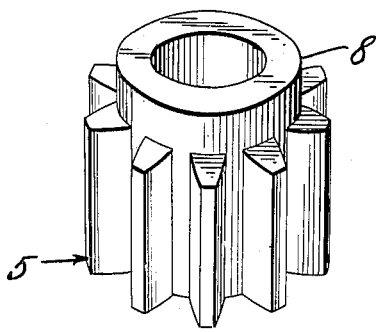
Figure 2 is a perspective view of the idler wheel employed.

The casing 1 for the pump has its lower and open end arranged in the main oil reservoir of a motor, provided with the usual tubular housing 2 for the oil pump shaft 3. The housing 2 at the portion thereof that is received in the casing is widened at and adjacent its lower and open end and in the said lower and widened portion there is the pump gear 4 that is fixed on the shaft 3 and the idler gear 5 which is in mesh with the gear 4. The gears are held in the housing by the usual disc and bottom plate 6 and there is a screen 7 between the widened portion of the housing and the casing 1 so that oil from the main reservoir will be filtered in the usual manner before passing into the pump.

The idler gear 5 is an important feature of my invention. The hub 8 for the idler gear is extended at one end a considerable distance above the teeth of the said gear, so that an oil space 9 is afforded between the housing, the upper ends of the teeth and the upper wall of the enlarged portion of the housing. The idler gear revolves on a shaft 10 that is fixed on the plate 6 and has its upper end received in a bearing opening in a thickened portion 11 at the top of the widened and opened end of the housing.

The housing is provided with the usual port whereby a lubricant is delivered between the shaft 2 and the tubular portion of the housing, and whereby such lubricant is forced to the parts to be lubricated and thereafter returned in the usual manner to the main oil reservoir.

By providing the housing with the passage 9 the lubricant from the main oil reservoir is not drawn into the pump with the same rapidity as were the space not provided and if the teeth of the idler gear extended the full length thereof, or in other words, were of the same length as the teeth of the gear 4 on the shaft 3. Also because of the space thus afforded the oil operated on by the coengaging gears will not be churned or lose its density as the said oil will promptly flow between the teeth of the said gears into the space 9 and the oil is delivered from the housing into the tubular portion 2 thereof from the said space 9.

As previously inferred I have made extensive experiments in order to reduce the consumption of lubricant in the type of cars employing oil pumps of a similar construction to that described, but in which the teeth of the idler gear of the said pumps extend the entire length thereof. These experiments were made necessary because of the excessive use of oil in the five trucks which I operate and also the excess of oil necessary in my own automobile and have found that with the construction of pumps as herein set forth the trucks which necessitated the use of from six to eight quarts of oil per day in a run of only a couple hundred of miles now run from seven to eight hundred miles without replenishing the oil supply, and that my personal car, which necessitated the employment of two quarts of oil for every one-hundred miles has been driven over five-hundred miles without the replenishment of the oil supply. This it will be noted greatly decreases the oil expense in the upkeep of the trucks and cars and while I concede that I employ parts or elements which have heretofore been employed in other connections, I have produced a new and novel result which cannot be attained by any other pump construction with which I am acquainted.

Having described the invention, I claim:

An oil pump including a housing and a tubular extension rotatably receiving a shaft having a pump gear provided with teeth the full length thereof, an idler gear meshing with the pump gear and the teeth thereof being shorter than the teeth of the pump gear to provide an extended hub portion under said idler gear for cooperation with the housing in forming a restricted bypass in one side of the housing to reduce the output of fluid by the gears during the rotation thereof.

In testimony whereof I affix my signature.

ROY E. BEVILL.